(12) United States Patent
Wildgen

(10) Patent No.: US 7,159,457 B2
(45) Date of Patent: Jan. 9, 2007

(54) MASS FLOW SENSOR AND METHOD FOR OPERATING THE MASS FLOW SENSOR

(75) Inventor: Andreas Wildgen, Nittendorf (DE)

(73) Assignee: Siemens Aktiengesellschaft, München (DE)

( * ) Notice: Subject to any disclaimer, the term of this patent is extended or adjusted under 35 U.S.C. 154(b) by 50 days.

(21) Appl. No.: 11/061,855

(22) Filed: Feb. 18, 2005

(65) Prior Publication Data
US 2006/0059986 A1    Mar. 23, 2006

(30) Foreign Application Priority Data
Feb. 24, 2004    (DE) .................... 10 2004 008 903

(51) Int. Cl.
*G01F 1/68* (2006.01)
(52) U.S. Cl. .................... 73/202.5; 73/204.22
(58) Field of Classification Search ............... 73/202.5, 73/204.22
See application file for complete search history.

(56) References Cited

U.S. PATENT DOCUMENTS 6,336,361 B1 * 1/2002 Uramachi et al. ........ 73/204.22
6,729,182 B1 * 5/2004 Uramachi et al. ........ 73/204.22
6,826,955 B1 * 12/2004 Zurek et al. ............. 73/204.22

* cited by examiner

*Primary Examiner*—Harshad Patel
(74) *Attorney, Agent, or Firm*—Martin A. Farber

(57) ABSTRACT

A mass flow sensor (1) has a sensor element whose measuring signal is representative of a mass flow in a main duct (4), specifically without taking into account the direction of flow of the mass flow which flows past the sensor element. In addition, a further sensor element is provided which is arranged in a recess in a body and which is coupled via a coupling element to the main duct (4), with the coupling element being embodied in such a way that the recess lies in the wind shadow of the main direction of flow of the mass flow in the main duct (4) and brings about a flow in the recess counter to the main direction of flow. A mass current is determined in the main duct (4) as a function of the measuring signal of the sensor element. A correction value is determined as a function of the measuring signal of the further sensor element. The mass flow which is determined is corrected by means of the correction value.

6 Claims, 3 Drawing Sheets

MASS FLOW SENSOR AND METHOD FOR OPERATING THE MASS FLOW SENSOR

FIELD AND BACKGROUND OF THE INVENTION

The invention relates to a mass flow sensor, in particular an air mass flow sensor which senses an air mass flow in an intake section of an internal combustion engine.

Mass flow sensors are known which have a sensor element whose measuring signal is representative of a mass flow in a main duct, for example in an intake connector of an intake section of an internal combustion engine. Such sensor elements are preferably embodied as temperature-dependent resistors. The required heating power of the sensor element is then a measure of the mass flow which is to be sensed. The measuring signal of such sensor elements is representative of the mass flow in the main duct but it does not take into account the direction of flow of the mass flow which flows past the sensor element.

In certain load states, in particular at specific rotational speeds, pulsations of the air mass flow occur in the intake section of internal combustion engines. The degree of modulation of the airflow in the intake section in the region of the mass flow sensor may be, for example, up to 300%. In this context the ratio of the oscillation amplitude of the mass flow to the average mass flow is considered as the degree of modulation, expressed as a percentage. For example, the mass flow with a degree of modulation of less than 100% flows only along one main direction of flow, that is to say the cylinders of the internal combustion engine, Only the speed of the flow is subject to certain fluctuations. With a degree of modulation of 100%, the mass flow comes to a standstill at its respective lowest speed. However, there is still no reverse of the direction of flow. Given a degree of modulation of greater than 100%, the direction of flow is respectively for a predefined time period, that is to say the mass flow then flows counter to the main direction of flow. If the degree of modulation is significantly above 100% and if the degree of modulation then increases, a positive measuring sensor of the measuring signal of the sensor signal increases strongly. This is due to the fact that the sensor element senses the mass flow both when it flows in the main direction of flow and when it flows back again, and parts of the mass flow are thus sensed twice.

A precise way of sensing the air mass flow which flows in a collector of the intake section of the internal combustion engine or else into the cylinders of the internal combustion engine is, however, a precondition for precisely setting a desired air/fuel ratio in the respective cylinders of the internal combustion engine.

SUMMARY OF THE INVENTION

The object of the invention is to provide a mass flow sensor and a method for operating the mass flow sensor which permit the mass flow to be sensed precisely.

The object is achieved by means of the features of the independent patent claims. Advantageous refinements of the invention are characterized in the subclaims.

The invention is distinguished by a mass flow sensor having a sensor element whose measuring signal is representative of a mass flow in a main duct, specifically without taking into account the direction of flow of the mass flow which flows past the sensor element. The mass flow sensor is assigned a further sensor element which is arranged in a recess in a body, which recess is coupled to the main duct via a coupling element, with the coupling element being designed in such a way that the recess lies in the wind shadow of the main direction of flow of the mass flow in the main duct and brings about a flow in the recess counter to the main direction of flow. Such a mass flow sensor is simply suitable for correcting the measuring signal of the sensor element as a function of the measuring signal of the further sensor element so that measuring errors of the measuring signal of the sensor element can be corrected on the basis of backflows of the mass flow which occur.

According to the aspect of the method for operating the mass flow sensor, the invention is distinguished by the fact that a mass flow in the main duct is determined as a function of the measuring signal of the sensor element and that a correction value is determined as a function of the measuring signal of the further sensor element and the mass flow which is determined is corrected by means of the correction value. As a result, when possibly severe backflows of the mass flow occur the mass flow can then easily be determined very precisely as well.

In one advantageous refinement of the invention, the recess is an electronic system recess of the body, in which recess a signal processing electronic system is arranged. As a result, the sensor element can be arranged very cost-effectively together with the signal processing electronic system and there is no need for an additional recess in the body.

In a further advantageous refinement of the invention, the coupling element is a duct which opens into the main duct counter to the main direction of flow. As a result, it is easily possible to ensure that when there is a reversal of flow, that is to say when the mass flow flows through the main duct counter to the main direction of flow, part of this backflow passes into the recess and thus brings about a change in the measuring signal of the further sensor element.

In a further advantageous refinement of the invention, the coupling element comprises a flow protection plate which prevents the mass flow in the main duct in the direction of the main flow from flowing into the recess, and which promotes the flowing in of the mass flow counter to the main direction of flow. As a result, given a corresponding embodiment of the flow protection plate it is easily possible to bring about a very high signal quality of the measuring signal of the further sensor element.

In a further advantageous refinement of the invention, the sensor element is arranged in an auxiliary duct which communicates with the main duct via an inlet opening and an outlet opening. In addition, the coupling element is embodied in such a way that it couples the recess of the body to the auxiliary duct. This has the advantage that it is easily possible to ensure that only the backflow components of the mass flow act on the measuring signal of the further sensor element, and these also act on the measuring signal of the sensor element in the auxiliary duct. As a result, the mass flow can thus be sensed extremely precisely in such a mass flow sensor.

BRIEF DESCRIPTION OF THE DRAWINGS

Exemplary embodiments of the invention are explained below with reference to the schematic drawings, in which.

DETAILED DESCRIPTION OF THE PREFERRED EMBODIMENT

Figure 1:
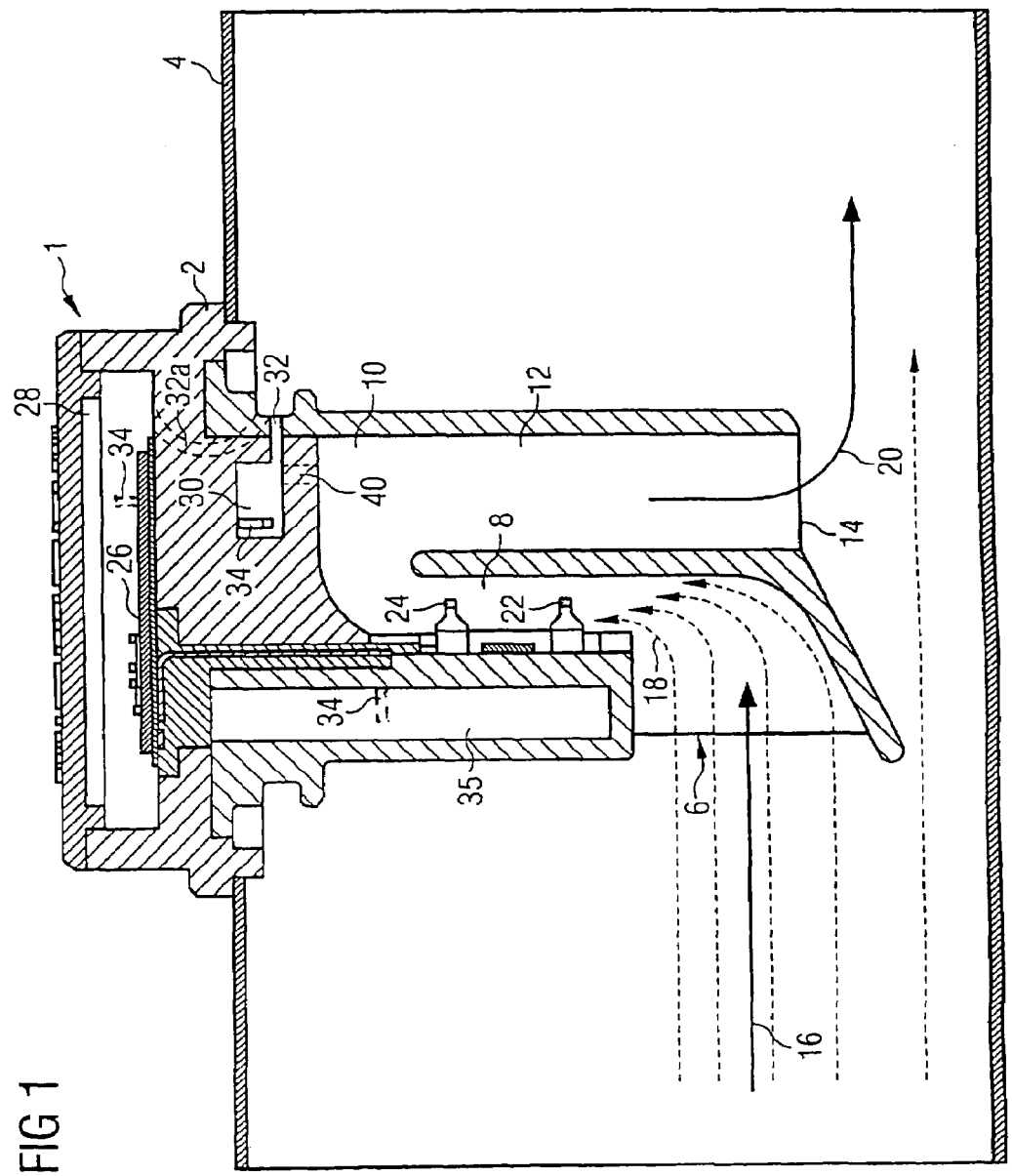
FIG. 1 shows a mass flow sensor 1 inserted into a main duct 4, with alternative locations of a sensor element 34 being indicated in phantom.

A mass flow sensor 1 (FIG. 1) which is suitable in particular for insertion into a main duct 4, has a housing 2 in which a U-shaped auxiliary duct is formed, which duct leads from a funnel-shaped inlet opening 6 via a first duct section 8 onto a second duct section 10 and finally to a third duct section 12, and finally opens again into the main duct in the region of an outlet opening 14.

The main direction of flow of the mass flow is designated by an arrow 16. Flow lines 18 are shown by dashes. The main direction of flow is the direction of flow of the mass flow in the main duct 4, in which direction the mass flow preferably flows. If the main duct 4 is embodied as an intake connector of an intake section of an internal combustion engine, the main direction of flow is the direction of flow of the mass flow towards the cylinders of the internal combustion engine.

The intake section of the internal combustion engine comprises both the intake connector and a collector and intake pipes leading from the latter to inlets of the cylinders of the internal combustion engine. In specific load states of the internal combustion engine, in particular at predefined rotational speeds which are dependent on the geometry of the intake section, in particular on the geometry of the intake pipes, greater or lesser degrees of oscillation of the mass flow column occur. If the degree of modulation of the mass flow is greater than 100%, part of the mass flow also flows back again through the main duct 4 counter to the main direction of flow. Measurements have shown that part of this backflow also flows out of the auxiliary duct through the outlet opening 14 counter to the outflow direction designated by the arrow 20 when the flow flows in the direction of the main direction of flow into the auxiliary duct.

A first sensor element 22 and a second sensor element 24 are arranged in the main duct 4. The first and second sensor elements 22, 24 are preferably temperature-dependent resistors whose heat transfer is influenced by the mass flow which flows past. The first sensor element 22 is preferably of high-impedance design and is used for compensating the temperature of the mass flow which flows past it. The second sensor element is preferably of low-impedance design. Its heat output is then a measure of the mass flow which flows through the auxiliary duct, and is correspondingly also a measure of the mass flow which flows through the main duct 4.

The first sensor element 22 is preferably arranged in a first bridge branch of a Wheatstone measuring bridge, while the second sensor element 24 is arranged in a second bridge branch of the Wheatstone measuring bridge. The measuring signal which is used to determine the mass flow is then preferably the power which is supplied to the Wheatstone measuring bridge or the voltage which drops across it or else the current flowing through it.

The second sensor element 24 has the property that the heat output which is emitted by it is independent of the direction of flow of the mass flow which flows past it. The result of this is that a mass flow which flows out and then back again is sensed twice.

In addition, the mass flow sensor 1 comprises a signal processing electronic system which can be accommodated, for example, on a printed circuit board and with which the first and second sensor elements 22, 24 are electrically conductively connected. The signal processing electronic system 26 is arranged in an electronic system recess 28 in the mass flow sensor 1.

In addition, a third sensor element 34 is provided which is arranged in such a way that its measuring signal is a measure of a possibly occurring backflow of the mass flow, that is to say a flow of the mass flow in the main duct 4 counter to the main direction of flow.

The third sensor element 34 is arranged in a recess which is coupled to the main duct 4 via a coupling element, with the coupling element being embodied in such a way that the recess lies in the wind shadow of the main direction of flow 4 of the mass flow in the main duct 4 and brings about a flow in the recess counter to the main direction of flow.

Figure 2:
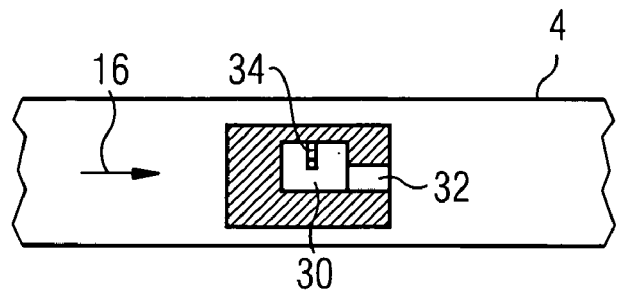
FIG. 2 shows a section through a part of a further embodiment of the mass flow sensor 1.

The recess is embodied, for example, as first recess 30 in which the coupling element is embodied as a duct 32 which opens into the main duct 4 counter to the main direction of flow. If flows counter to the main direction of flow then occur in the main duct 4, flows, at least turbulences, occur in the first recess 30, as a result of which the measuring signal of the third sensor element 34 changes. The third sensor element 34 is preferably a sensor element which is of cost-effective design and is preferably a temperature-dependent resistor, for example a simple heating wire or else a heating-film resistor. As a result of the occurrence of a flow in the first recess 30, the heat transfer at the third sensor element 34 changes. This physical effect results in a change in its measuring signal and can be suitably processed in the signal processing electronic system 26. When the mass flow flows in the direction of the main direction of flow through the main duct 4, there is no appreciable movement of the mass of gas which is located in the first recess 30. The decisive factor for the formation of the recess, that is to say for example of the first recess 30 and of the coupling element, that is to say for example the duct 32, is that the degree of backflow of the mass flow can be concluded by reference to the measuring signal of the third sensor element 34. FIG. 2 shows such an embodiment of the first recess 30 and of the duct 32.

The third sensor element 34 can particularly easily also be arranged in the electronic system recess 28 and preferably together with the signal processing electronic system 26 there. This has the advantage that there is no need to form an additional recess in the housing 2. For example a duct 32a which corresponds to the duct 32 can then be provided as the coupling element, said duct 32a opening, on the one hand, into the electronic system recess 28 and, on the other hand, into the main duct 4 counter to the main direction of flow.

Figure 3:
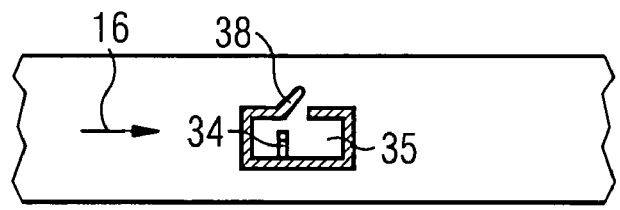
FIG. 3 shows a further section through a part of yet another embodiment, depicted in FIG. 5, of the mass flow sensor 1, as viewed in the upward direction of FIG. 5.
Figure 5:
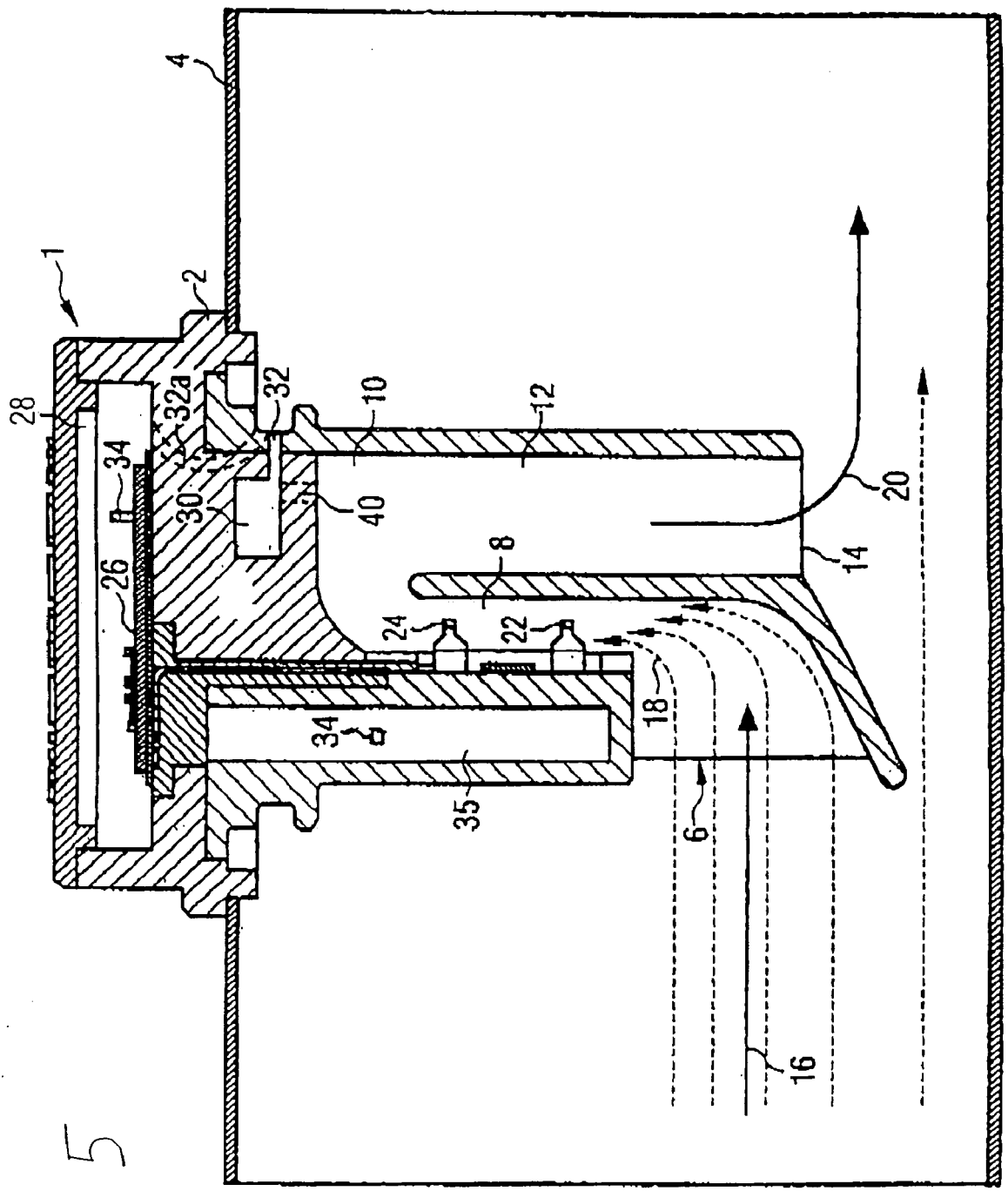
FIG. 5 shows a further embodiment of the mass flow sensor 1 disposed in the main duct 4.

The third sensor element 34 can alternatively also be arranged in a second recess (shown also in FIG. 5) 35 in which, for example, the coupling element comprises a flow protection plate 38 (FIG. 3) which prevents the mass flow in the main duct 4 in the main direction of flow from flowing into the second recess 35 and which promotes the flowing in of the mass flow counter to the main direction of flow. In this way, the coupling element can be embodied even if the third sensor element 34 is arranged in the first recess 30 or in the electronic system recess 28.

Alternatively, the coupling element can also be embodied as a duct 40 (FIG. 1) via which the first recess 30 communicates with the auxiliary duct. In this case, the duct 32 is then not assigned to the first recess 30.

Figure 4:
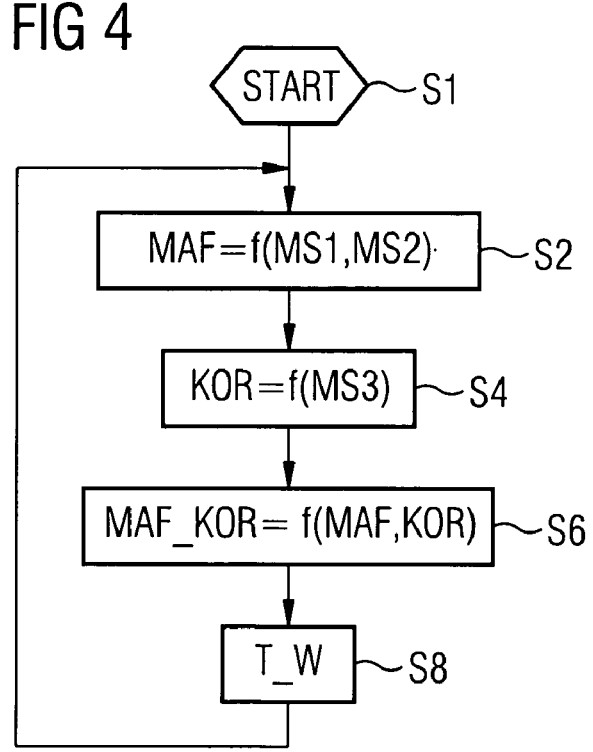
FIG. 4 is a flowchart of a program for operating the mass flow sensor 1.

A program (FIG. 4) for operating the mass flow sensor 1 is started in a step S1. The program may be processed, for example, in a microprocessor of the signal processing electronic system 26. Alternatively, it may, however, possibly also be implemented by corresponding circuit means of the signal processing electronic system 26. In a step S2, the mass flow, preferably the air mass flow MAF, is subsequently determined as a function of the measuring signal MS1 of the first and second sensor elements 22 and as a function of the measuring signal MS2 of the second sensor element 24. However, only one measuring signal which describes the behavior of both sensor elements 22, 24, for example the electric power which is fed to the Wheatstone measuring bridge, can also alternatively be used for this purpose.

In a step S4, a correction value KOR is subsequently determined as a function of a third measuring signal MS3, of the third sensor element 34. This is preferably carried out by means of a characteristic curve which has been determined in advance by trials with the mass flow sensor 1.

In a step S6, a corrected mass flow MAF_KOR is then determined as a function of the sensed mass flow and the correction value which is determined. The program then remains in a step S8 for a predefined waiting time period T_W before it continues again in the step S2.

I claim:

1. A mass flow sensor to be located in a main duct, and comprising: a first sensor element, a second sensor element, and a recess in a body of the mass flow sensor, wherein the first sensor element provides a measuring signal that is representative of air mass flow (MAF) in the main duct (4) independently of a direction of flow of the mass flow (MAF) which flows past the first sensor element, the second sensor element is arranged in the recess and is coupled via a coupling element to the main duct (4) to provide a measurement signal responsive only to a flow of air in the main duct in a direction opposite to a main direction of air mass flow in the main duct, and the coupling element permits the recess to lie in a wind shadow of the main direction of flow of the mass flow (MAF) in the main duct (4) and brings about a flow of air mass in the recess counter to the main direction of flow of the air mass.

2. The mass flow sensor as claimed in claim 1, further comprising a signal processing electronic system, (26) disposed in said recess (28) in the body.

3. The mass flow sensor as claimed in claim 1, wherein the coupling element is a duct (32) which opens into the main duct (4) counter to the main direction of flow.

4. The mass flow sensor as claimed in claim 1, wherein the coupling element comprises a flow protection plate (38) which prevents the mass flow (MAF) in the main duct (4) in the direction of the main flow from flowing into the recess, and which promotes the flowing in of the mass flow (MAF) counter to the main direction of flow.

5. The mass flow sensor as claimed in claim 1, wherein the first sensor element is arranged in an auxiliary duct which communicates with the main duct (4) via an inlet opening (6) and an outlet opening (14), and wherein the coupling element couples the recess to the auxiliary duct.

6. A method for operating a mass flow sensor according to claim 1, wherein the method provides that a mass flow (MAF) in the main duct is determined as a function of the measuring signal of the first sensor element, that a correction value (KOR) is determined as a function of the measuring signal of the second sensor element, and that the mass flow (MAF) which is determined is corrected by means of the correction value (KOR).

* * * * *